United States Patent [19]

Esmond

[11] 4,324,658
[45] Apr. 13, 1982

[54] TRANSFER DEVICE HAVING A THIN WALL PLATE

[76] Inventor: William G. Esmond, 800 Country Club Rd., Havre de Grace, Md. 21078

[21] Appl. No.: 805,394

[22] Filed: Jun. 10, 1977

[51] Int. Cl.³ ............................................. B01D 31/00
[52] U.S. Cl. ................................ 210/321.3; 210/456; 210/541
[58] Field of Search ........... 210/321 R, 321 B, 321 A, 210/486, 433 M, 343, 344, 456, 541; 165/147; 55/16, 158

[56] References Cited

U.S. PATENT DOCUMENTS

| | | | |
|---|---|---|---|
| 2,610,835 | 9/1952 | Hytte | 165/147 |
| 2,872,165 | 2/1959 | Wennerberg | 257/245 |
| 3,074,559 | 1/1963 | Sa ino | 210/321 B |
| 3,397,785 | 8/1968 | Jarvis et al. | 210/125 |
| 3,534,860 | 10/1970 | Dibelius et al. | 210/321 B |
| 3,540,595 | 11/1970 | Edwards | 210/321 B |
| 3,541,595 | 11/1970 | Edwards | 210/321 B |
| 3,631,986 | 1/1972 | Sausse | 210/321 B |
| 3,703,466 | 11/1972 | LaForest et al. | 210/321 A |
| 3,910,841 | 10/1975 | Esmond | 210/321 B |
| 3,912,637 | 10/1975 | Edmond | 210/321 B |

Primary Examiner—Charles N. Hart
Assistant Examiner—David R. Sadowski
Attorney, Agent, or Firm—Charles E. Brown

[57] ABSTRACT

This relates to a transfer device of the type including dialyzers wherein plates are arranged in stacked relation separated by separator sheets or plates with there being different liquids or fluids flowing on opposite sides of the separated sheets for transfer therethrough. Such devices are relatively thick due to the required thickness of plates which define the channels for the fluids. The transfer plates of this device are shaped from a relatively rigid and thin sheet material with the fluid passages being defined by the transfer plate on opposite sides thereof, thereby resulting in a relatively thin plate making it possible to have a maximum capacity within a relatively thin stack.

17 Claims, 7 Drawing Figures

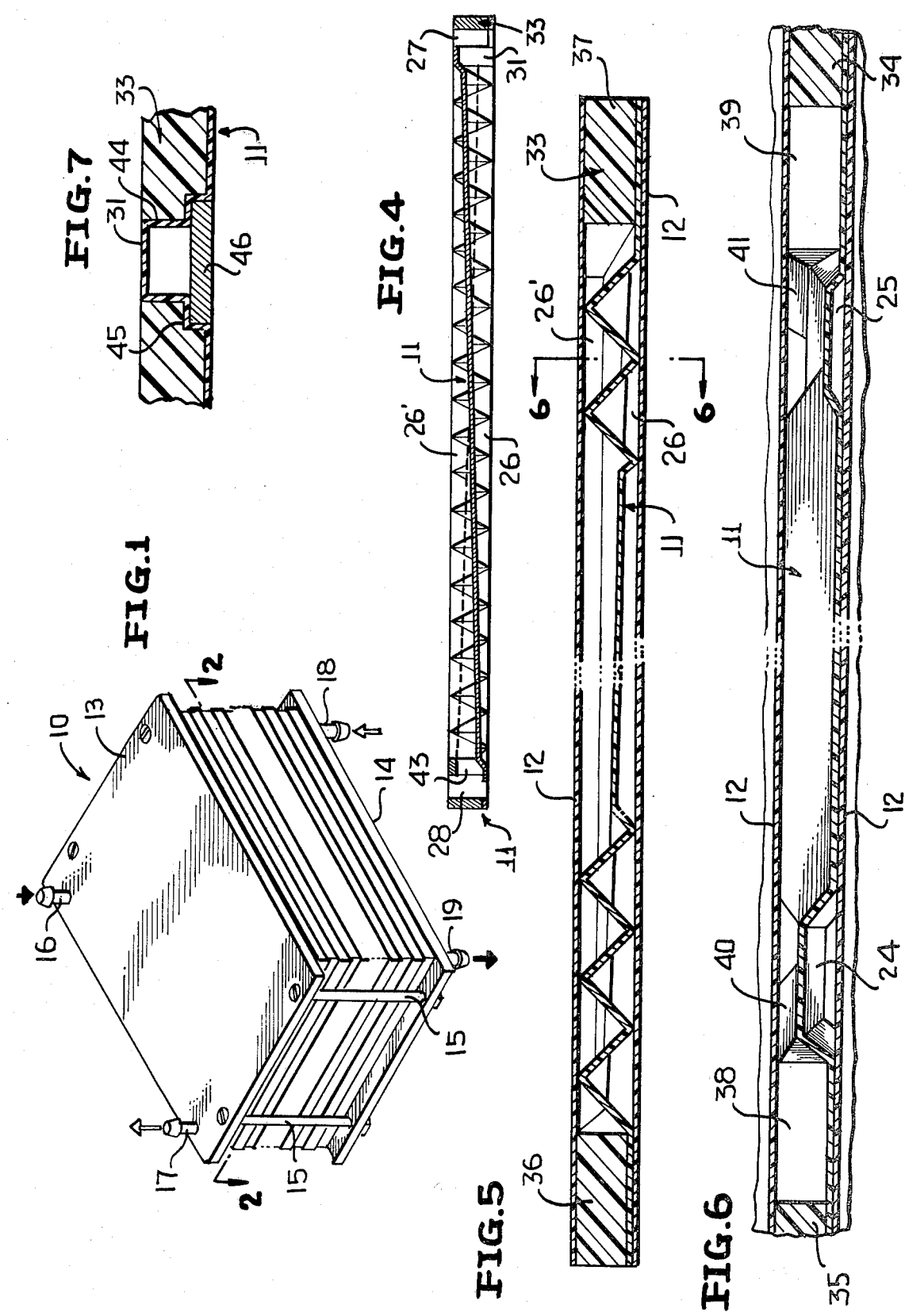

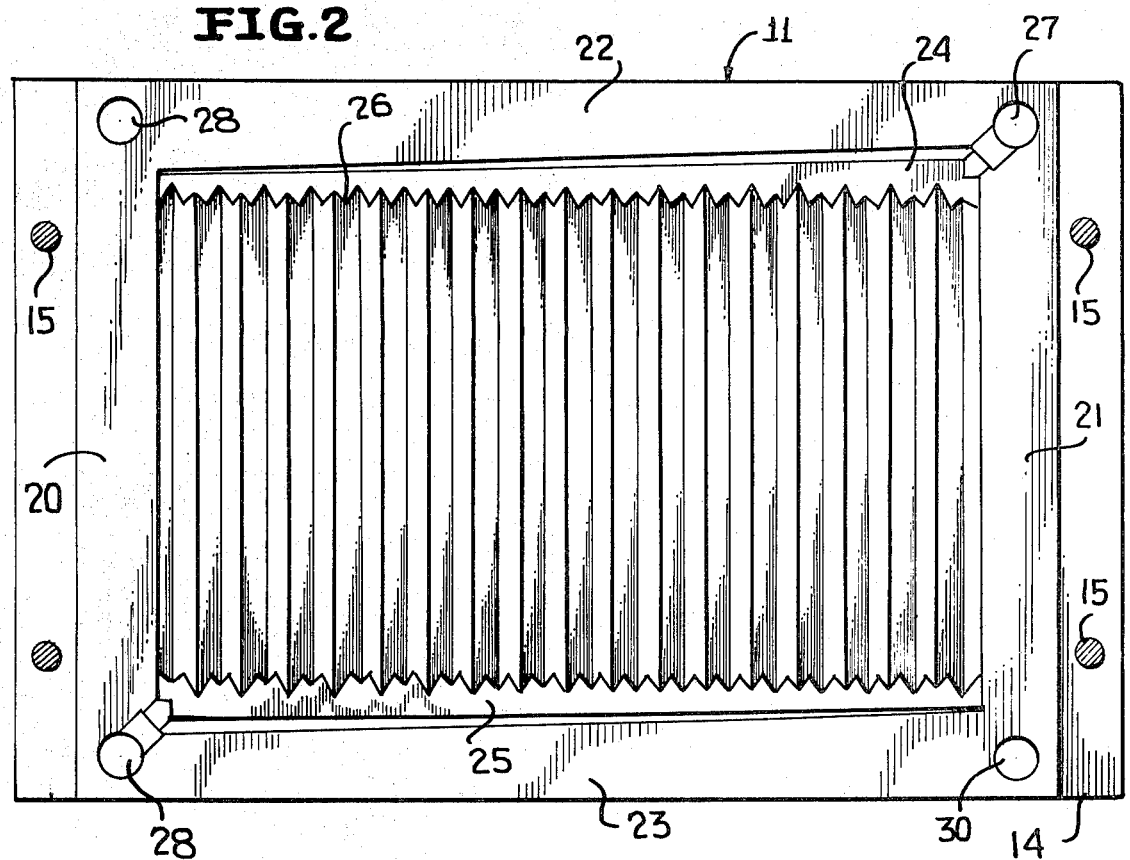
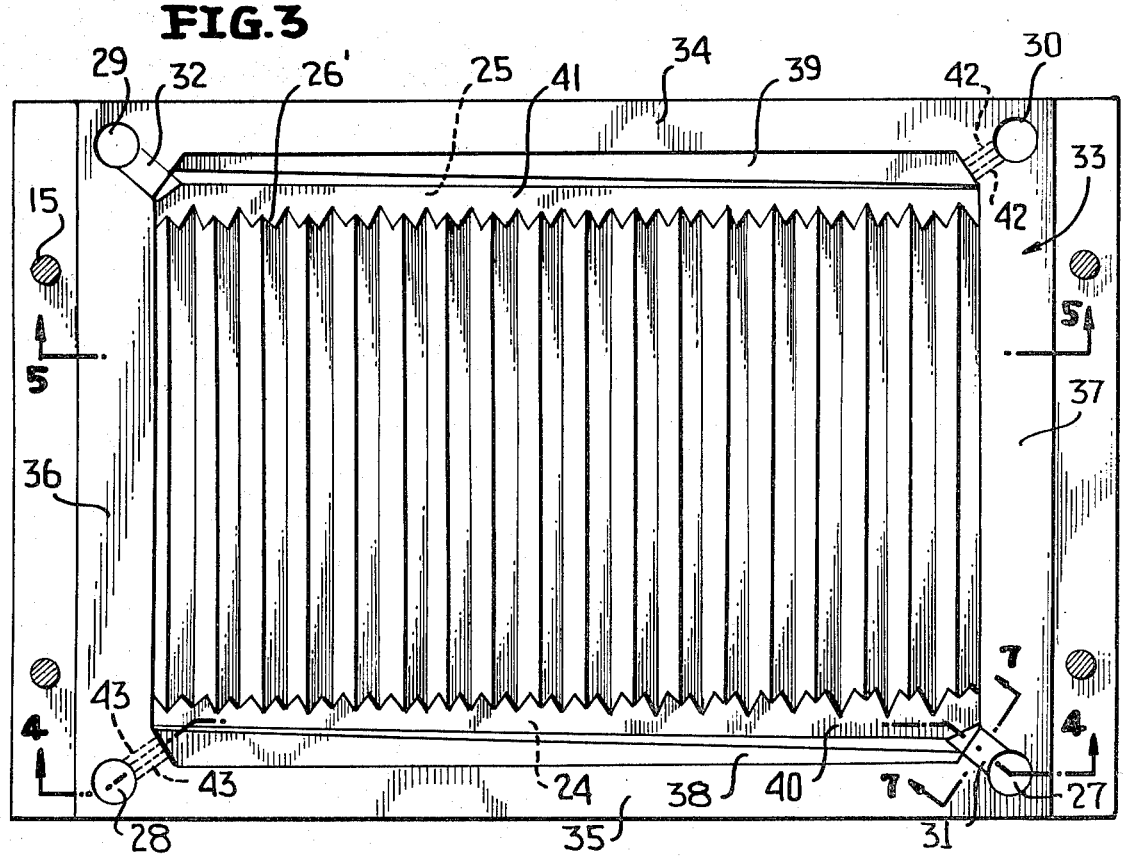

TRANSFER DEVICE HAVING A THIN WALL PLATE

This invention relates in general to new and useful improvements in transfer devices, particularly transfer devices suitable for the treatment of blood such as dialyzers and the like.

BACKGROUND OF THE INVENTION

One of the problems which continues to exist is the size of the transfer devices utilized in treating blood with a resultant large priming volume. It has been found that maximum transfer will occur with a relatively thin blood stream, but the difficulty has been in forming the transfer devices so as to provide for such generally laminar flow of blood while assuring constant flow, due to collapse of the material defining the passages. Another desire has been to form a dialyzer of such a size that it could properly be attached to or even incorporated within the body for use over longer periods of time than is presently feasible.

SUMMARY OF THE INVENTION

In accordance with this invention the size of the transfer device may be reduced to a minimum by providing a transfer plate which is preferably molded of rigid, thin plastics material with the transfer plate defining the required fluid passages and both the blood and the bath and the fluid passages being separated by thin, preferably rigid, separator plates. By forming all of the plates of relatively rigid material, collapse of the passages is absolutely prevented. At the same time the passages may be made relatively small with maximum surface areas so as to provide for maximum transfer. At the same time, by forming the necessary plates or sheets from very thin material, the over-all thickness of the stack is greatly reduced as compared to prior devices.

Most particularly, there is provided a transfer plate which is molded from plastics material having a thickness on the order of 0.005 to 0.010 inch, with the molded plate having fluid supply and return troughs along two edges thereof on both sides thereof and extending between these troughs are fluid flow passages with adjacent flow passages being on opposite sides of the transfer plate.

In order that the transfer plate may be readily sealed to separator plates, each transfer plate has associated therewith a frame which is of a thickness corresponding to the depth of the flow passages. The spacer frame thickness is such so as to accomodate troughs of a necessary depth and to facilitate the forming of flow channels into and out of the troughs from flow passages extending through the spacer frame and transfer plate normal to the stack.

Most specifically, in accordance with this invention, it is proposed to provide a transfer plate for a dialyzer and like transfer device wherein the transfer plate is formed of sheet material shaped to define adjacent to two opposite edges thereof and on both sides thereof fluid flow troughs. The transfer plate further has a central portion disposed between the troughs formed to define a generally corregated arrangement defining adjacent fluid flow passages on both sides thereof. The fluid flow passages extend between and are in communication with respective ones of the troughs. Adjacent ones of the troughs on opposite sides of the transfer plate are in side-by-side relation in the direction of the flow passages, and the transfer plate has a substantially uniform material thickness. The transfer plate is utilized in a transfer device which comprises a stack of such transfer plates and separator plates stacked in alternating relation with the separator plates being planar and formed of substantially rigid plastics material. Further, the transfer device may include a separately formed spacing frame sealed to at least one side of each transfer plate and the separator plates are clamped between adjacent spacer frames and transfer plates.

With the above and other objects in view that will hereinafter appear, the nature of the invention will be more clearly understood by reference to the following detailed description, the appended claims and the several views illustrated in the accompanying drawings.

IN THE DRAWINGS:

FIG. 1 is a perspective view of a transfer device formed in accordance with this invention.

FIG. 2 is a horizontal sectional view taken through the transfer device along the line 2—2 of FIG. 1, and shows the configuration of one side of the transfer plate.

FIG. 3 is a horizontal sectional view taken through the transfer device of FIG. 1, but in the direction opposite from FIG. 1, and shows the opposite side of the transfer plate including the spacer frame.

FIG. 4 is a sectional view taken through the trough of the transfer plate and spacer frame of FIG. 3 along the line 4—4, and diagrammatically shows the configuration of the transfer plate.

FIG. 5 is a transverse sectional view on an enlarged scale taken through one transfer plate and spacer frame along the line 5—5 of FIG. 3, and shows more specifically the details of the transfer plate.

FIG. 6 is a vertical sectional view taken along the line 6—6 of FIG. 5 and shows further details of the transfer plate and its relationship to the spacer frame.

FIG. 7 is an enlarged fragmentary sectional view taken along the line 7—7 of FIG. 3 and shows the details of one of the fluid channels.

Referring now to the drawings in detail, it will be seen that there is illustrated in FIG. 1 a transfer device formed in accordance with this invention. The transfer device is generally identified by the numeral 10 and includes a plurality of transfer plates, generally identified by the numeral 11, and a plurality of separator plates or sheets 12 arranged in stacked alternating position. The stack of transfer plates and separator sheets is clamped between two clamping plates 13, 14 which are urged together by means of fasteners, such as bolts 15. The plate 13 is provided with a supply fitting 16 and a discharge fitting 17 while the plate 14 is provided with a supply fitting 18 and a discharge or return fitting 19. It is to be noted that the fittings 16 and 19 handle one fluid while the fittings 17 and 18 handle a second fluid. The fittings 16 and 19 are in diagonal relation and the same is true of the fittings 17 and 18, with the fittings being arranged at the four corners of the transfer device.

The principal feature of the transfer device 10 is the formation of the transfer plates 11. Each transfer plate 11 is formed of thin, rigid sheet material and is preferably formed by a vacuum forming method from a plastics material. Inasmuch as the transfer device 10 is primarily intended to be utilized in conjunction with human blood, it is, of course, necessary that the plastics material be compatible with blood. The plastics material from which the transfer plate 11 is preferably formed should have a thickness on the order of 0.005 to 0.010 inch.

As will be apparent from FIG. 2, the transfer plate 11 is generally rectangular in outline and has a border extending therearound including opposite sides 20, 21 and 22, 23. Adjacent the border side 22, the sheet material of the transfer plate 11 has molded thereon a supply trough 24 which decreases in width and thickness right to left. The transfer plate 11 has a similar but reversely oriented return trough 25 disposed adjacent the border side 23 with the trough 25 increasing in width and depth right to left.

The space between the troughs 24, 25 and the border sides 20, 21 is configurated to define a plurality of fluid flow passages 26 on the upper side of the transfer plate with the fluid flow passages being normal to the troughs 24 and extending therebetween. As is best shown in FIG. 5, the central portion of the transfer plate is of corrugated configuration so that each flow passage 26 is generally triangular in cross-section and adjacent flow passages 26 are separated by like triangular cross-section flow passages 26' formed on the opposite or underside of the transfer plate.

At this time it is pointed out that the border of the transfer plate 11 has formed in each corner thereof a fluid passage which extends therethrough, the fluid passages for purposes of identification being identified by the numerals 27, 28, 29 and 30.

As will be described in more detail hereinafter, the transfer plate 11 is configurated so as to provide a flow channel 31 from the passage 27 into the inlet or wide end of the trough 24. A similar channel 32 extends from the passage 29 into the wide end or discharge end of the trough 25 for receiving returning fluid.

As is best shown in FIG. 5, the border of the transfer plate 11 is planar and the portions thereof defining the troughs 24 and 25 and the passages 26 and 26' are offset to one side of that plate. In order that the separator plates 12 may form a seal with the transfer plates 11, each transfer plate 11 also includes a spacer frame, generally identified by the numeral 33. Referring now to FIG. 3 in particular, it will be seen that the spacer frame 33 is of the same outline as the transfer plate 11 and is generally of a hollow configuration so as to include opposite sides 34, 35, 36 and 37. The spacer frame 33 is seated on the border of the transfer plate 11 and is suitably sealed thereto. The spacer frame 33 is also preferably formed of plastics material and is preferably formed of a material compatible with human blood.

The sides 36, 37 of the spacer frame are disposed along opposite edges of the corrugated central portion of the transfer plate, as is best shown in FIGS. 3 and 5. On the other hand, the inner edges of the sides 34, 35 of the spacer frame are spaced outwardly with respect to those portions of the transfer plate which define the troughs 24, 25 so as to form alongside the troughs 24, 25 on the opposite sides of the transfer plate troughs 38, 39, respectively. It is to be noted that the troughs 38, 39 are in communication with the flow passages 27 with there being trough portions 40, 41, respectively, overlying or aligned with the troughs 24, 25.

It is to be noted that the trough 39 and the trough portion 41 form the supply for the fluid passages 27 and are in communication with the passage 30 through channels or ports 42 molded in the spacer frame 33 as shown in FIG. 3. The trough 38 and the trough portion 40 form a return trough for returning fluid into the passage 28 and the left end of the trough 38, as viewed in FIG. 3, is in communication with the passage 28 by means of channels 43 formed in the spacer frame 37.

At this time it is pointed out that the troughs 24 and 38 are disposed in side-by-side partially overlapping relation with the troughs varying in width but with the combined widths of the two troughs remaining substantially constant. This same relationship exists between the troughs 25 and 39.

Referring now to FIG. 7, the details of the channel 31 are shown. It will be seen that the channel 31 is molded so as to be of the same height as the spacer frame 33 and is received in a notch 44 formed therein. On the side of the transfer plate 11 where the border thereof exists, the channel 31 is stepped as at 45 and has seated therein a small plate 46 which serves to support the adjacent separator plate in this area. Further, the plate 46 serves to assure against leakage out through the channel 31.

At this time it is pointed out that the inlet fitting 16 opens into the passage 27 and supplies blood to the entire stock. The blood is returned through the passage 29 which opens into the discharge fitting 19.

In a like manner, the bath liquid is supplied into the passage 30 through the inlet fitting 18 and is returned through the passage 28 to the discharge fitting 17. It will be seen that there is a cross-flow in opposite directions of the blood and bath.

At this time it is pointed out that it has been found that the preferred depth of the passages 26, 26' is on the order of 0.020 to 0.025 inch and that the over-all thickness of each transfer plate and spacer frame 33 is preferably on the order of 0.030 inch. With respect to the spacer plates 12, they are preferably formed of a relatively stiff plastics material which must be compatible with human blood. Numerous plastics materials are suitable, including polycarbonates, and other plastics materials suitable for this purpose are being developed. In order to obtain the desired transfer, the separator plates are preferably of a thickness on the order of 0.0005 to 0.001 inch.

It will be readily apparent that the configuration of the transfer plate 11 is such that there can be a high transfer capability with a minimum amount of blood being within the transfer device at any one time. Because of the rigid characteristics of both the transfer plate and the separator plate, the flow passages 26, 26' may be made relatively small without the danger of collapse.

It is pointed out here that while the term plate has been utilized with respect to both the transfer plates 11 and the separator plates 12, it is to be pointed out here that when the transfer device is to be utilized as a dialyzer and the like, these plates are actually in the form of membranes. Also, while it is desirable that the plates be relatively rigid, it is to be understood that the plates may be in the form of films of plastics material and in certain instances, particularly the separator plates 12, may have a greater degree of flexibility.

It is also pointed out here that while the separator plates 12 may be of sufficient rigidity to prevent nesting of the central portions of the transfer plates 11, it may be desirable that the corrugated portion of each transfer plate which defines the passages 26, 26', be so configurated wherein the passages 26, 26' either are skewed relative to the side edges of the transfer plate, or are arcuate so that when the transfer plates are stacked, the passages 26, 26' being disposed in crossing relation and the apices of the corrugations of adjacent transfer plates be arranged in crossing supporting relation.

Although only a preferred embodiment of the transfer device has been specifically illustrated and described, minor variations may be made in the transfer device without departure from the spirit and scope of the invention as defined by the appended claims.

I claim:

1. A transfer plate for a dialyzer and like transfer device, said transfer plate being formed from sheet material shaped to define adjacent to two opposite edges thereof and on both faces thereof fluid flow troughs, said transfer plate further having a central portion disposed between said troughs formed to define a generally corrugated arrangement defining adjacent fluid flow passages on both faces thereof, said passages extending between and generally normal to and being in communication with respective ones of said troughs, adjacent ones of said troughs on opposite faces of said plate having cross sections which overlap when viewed from said edge of said transfer plate, said transfer plate having a substantially uniform material thickness throughout.

2. The transfer plate of claim 1 wherein the troughs on each face thereof include a supply trough and a return trough, at least one of said supply troughs having an inlet end, and reducing in width and depth from said inlet end, and at least one of said return troughs having a discharge end and increasing in width and depth toward said discharge end.

3. The transfer plate of claim 1 wherein said troughs are of varying width along their lengths with the combined widths of said troughs being generally constant.

4. The transfer plate of claim 1 wherein said side-by-side troughs include a supply trough and a return trough.

5. The transfer plate of claim 1 wherein each of the troughs on one face of said transfer plate has a portion overlapping the respective trough on the other face of said transfer plate in a direction normal to the plane of said transfer plate and normal to the direction of said side-by-side relation.

6. The transfer plate of claim 1 wherein said transfer plate lies in a general plane and is generally rectangular and has corners, and there is a flow passage through said each corner normal to said general plane.

7. The transfer plate of claim 1 together with a separately formed spacing frame sealed to one face of said transfer plate, said transfer plate having a peripheral border portion and said frame being sealed on said border portion.

8. The transfer plate of claim 1 together with a separately formed spacing frame sealed to one face of said transfer plate, said transfer plate having a peripheral border portion and said frame being sealed on said border portion, said passages and said frame being of substantially the same depth.

9. The transfer plate of claim 1 wherein said transfer plate is a molded plastics material plate.

10. The transfer plate of claim 1 wherein said transfer plate is a molded plastics material plate and said material thickness is on the order of 0.005 to 0.010 inch.

11. The transfer plate of claim 1 together with a separately formed spacing frame sealed to one face of said transfer plate.

12. The transfer plate of claim 11 wherein said frame defines an outer side wall of remote ones of said troughs on one face of said transfer plate.

13. The transfer plate of claim 11 wherein said transfer plate and said frame are generally rectangular and have corners, there is a flow passage normal to the plane of said transfer plate through said transfer plate and said frame at each corner, and there is a channel connecting each normal flow passage with a respective nearest one of said flow troughs.

14. The transfer plate of claim 13 wherein those channels on one face of said transfer plate being formed by said transfer plate and those channels on the opposite face of said transfer plate are formed by said frame.

15. A transfer device for use as a dialyzer and the like, said transfer device comprising a stack of transfer plates and separator plates stacked in alternating relation, said separator plates being planar and formed of a substantially rigid plastics material and each transfer plate being formed from sheet material shaped to define adjacent two opposite edges thereof and on both sides thereof fluid flow troughs, said transfer plate further having a central portion disposed between said troughs formed to define a generally corrugated arrangement defining adjacent fluid flow passages on both sides thereof, said passages extending between and being in communication with respective ones of said troughs, adjacent ones of said troughs on opposite sides of said plate having cross sections which overlap when viewed from said edge of said transfer plate, said transfer plate having a substantially uniform material thickness throughout.

16. The transfer device of claim 15 wherein there is a separately formed spacing frame sealed to at least one side of each transfer plate, and said separator plates being clamped between adjacent spacer frames and transfer plates.

17. The transfer device of claim 15 wherein each transfer plate is formed of molded plastics material with said material thickness being on the order of 0.005 to 0.010 inch and each separator plate has a thickness on the order of 0.001 inch.

* * * * *